(12) United States Patent
Baba et al.

(10) Patent No.: US 8,070,947 B2
(45) Date of Patent: Dec. 6, 2011

(54) PERMSELECTIVE MEMBRANE MODULE AND METHOD FOR MANUFACTURING THE SAME

(75) Inventors: Koichi Baba, Shiga (JP); Toshiyuki Yagi, Shiga (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 468 days.

(21) Appl. No.: 11/815,086

(22) PCT Filed: Jan. 30, 2006

(86) PCT No.: PCT/JP2006/301407
§ 371 (c)(1),
(2), (4) Date: Jul. 30, 2007

(87) PCT Pub. No.: WO2006/080482
PCT Pub. Date: Aug. 3, 2006

(65) Prior Publication Data
US 2009/0050555 A1 Feb. 26, 2009

(30) Foreign Application Priority Data

Jan. 31, 2005 (JP) .................................. 2005-023834

(51) Int. Cl.
*B01D 63/02* (2006.01)
*B01D 61/00* (2006.01)
(52) U.S. Cl. ......... 210/321.69; 210/321.72; 210/321.79; 210/321.8; 210/321.88; 210/321.89
(58) Field of Classification Search .................. None
See application file for complete search history.

(56) References Cited

U.S. PATENT DOCUMENTS

| | | | | |
|---|---|---|---|---|
| 4,876,006 A | * | 10/1989 | Ohkubo et al. | 210/321.69 |
| 5,470,469 A | * | 11/1995 | Eckman | 210/321.8 |
| 6,156,200 A | * | 12/2000 | Zha et al. | 210/321.69 |
| 6,331,248 B1 | * | 12/2001 | Taniguchi et al. | 210/321.8 |
| 6,524,481 B2 | * | 2/2003 | Zha et al. | 210/636 |
| 6,841,070 B2 | * | 1/2005 | Zha et al. | 210/321.69 |
| 2004/0035780 A1 | * | 2/2004 | Mahendran et al. | 210/321.8 |
| 2005/0006308 A1 | * | 1/2005 | Cote et al. | 210/636 |

FOREIGN PATENT DOCUMENTS

| | | |
|---|---|---|
| JP | 61-106307 | 7/1986 |
| JP | 61-192310 | 8/1986 |
| JP | 61-242607 | 10/1986 |
| JP | 01-307408 | 12/1989 |
| JP | 02-203924 | 8/1990 |
| JP | 3-47089 | 4/1991 |

(Continued)

Primary Examiner — Krishnan S Menon
(74) Attorney, Agent, or Firm — Fish & Richardson P.C.

(57) ABSTRACT

To provide a method for manufacturing a module having a selectively permeable membrane wherein the surface of the selectively permeable membrane thereof can be washed with good efficiency and further contaminants having been exfoliated from the surface of the membrane by a washing operation can be discharged from the inside of a housing with good efficiency; and the above module having a selectively permeable membrane. A module wherein a selectively permeable membrane is held in a housing and both ends of the above selectively permeable membrane are fixed, the both ends of the above selectively permeable membrane are fixed to an upper holder and an under holder connected by at least one washing tube, and then, the membrane is held in the housing; and a module having a selectively permeable membrane manufactured by the above manufacturing method.

16 Claims, 8 Drawing Sheets

| | FOREIGN PATENT DOCUMENTS | |
|---|---|---|
| JP | 04-078425 | 3/1992 |
| JP | 07-031852 | 2/1995 |
| JP | 07-136469 | 5/1995 |
| JP | 10-28846 | 2/1998 |
| JP | 2932394 | 5/1999 |
| JP | 2000-237551 | 9/2000 |
| JP | 2004-050093 | 2/2004 |

* cited by examiner

PERMSELECTIVE MEMBRANE MODULE AND METHOD FOR MANUFACTURING THE SAME

TECHNICAL FIELD

The present invention relates to a method for manufacturing permselective membrane modules which treat water containing suspended matter (hereinafter referred to as "raw water"), such as river water, lake water, ground water, brackish water, seawater or sewage, in order to remove particles, bacteria and the like from the water. More specifically, the invention relates to a permselective membrane module that can feed raw water uniformly to each permselective membrane, uniformly and efficiently clean solids such as suspended matter deposited on the membrane surface, and efficiently discharge the suspended solids that are peeled from the permselective membrane surface.

BACKGROUND ART

When raw water is filtered using a permselective membrane module directly or after pretreatment, a pressurized or submerged type module is generally employed. With the pressurized type, permselective membranes are housed in a vessel, and raw water is fed to the membranes by means of external pressure produced by, for example a pump, and filtered. With the submerged type of module, permselective membranes are submerged in a filtration tank, and raw water is sucked through the membranes to obtain the filtrate.

Pressurized hollow fiber membrane modules are classified into outside-in and inside-out types. With the outside-in type, raw water is fed to the outer surface of the hollow fiber membranes and filtered from the inside of the membranes. With the inside-out type, raw water is fed to the inner surface of the membranes and filtered from the outside of the membranes. After a certain period of filtration, cleaning is generally carried out to remove suspended solids deposited on the surface of the hollow fiber membranes. More particularly, with the outside-in type, part of the filtrate is forced to flow from the inside of the membranes to the outside, and with the inside-out type, from the outside to the inside, thereby peeling the solids off of the membrane surface.

Because the outer surface area of the membrane is larger than the inner surface area, the outside-in type, in which raw water is supplied from the outside, reduces the amount of water per membrane area to decrease the load on the membrane, which is advantageous for producing the same amount of filtrate. In recent years, however, hollow fiber membrane modules have increased in size, and the number of hollow fiber membranes contained in the vessel has also increased. Thus, although suspended solids on the surface of the membranes near the center of the membrane bundles can be removed by cleaning, it is difficult to efficiently discharge the solids to the outside of the bundles, causing the possibility of re-deposition on the membrane surface.

An air scrubbing technique is used in the cleaning described above. In air scrubbing, air is introduced from the lower part of a hollow fiber membrane module. The resulting bubbles rise through membranes and shake the hollow fiber membranes, thereby widening the gap between membranes and efficiently discharging the suspended solids to the outside of the module. In a large module, however, even if air is introduced from the outer periphery of the bundles, the air does not reach the hollow fiber membranes near the center of the membrane bundles. This results in problems such as the inability to clean suspended solids on the surface of hollow fiber membranes near the center of the membrane bundles.

Various approaches have been taken to overcome these problems. For example, in the module shown in FIG. 1 of Patent Document 1, which comprises U-shaped bundles of hollow fiber membranes bonded thereto, when air is introduced from below the U-shaped region, the bubbles pass between membranes to reach the membranes near the center of the bundles, thus allowing efficient cleaning. However, because the hollow fiber membranes in the U-shaped region are not fixed, the membranes are strongly shaken during air scrubbing, resulting in possible membrane breakage. Moreover, during this shaking, friction is produced between the membranes and the binding member that is used to form the U-shape, resulting in possible membrane breakage.

Patent Document 1: JP H10-28846 A

Patent Document 2 suggests providing a feed water inlet through a space opened in a resin partition which seals hollow fiber membranes with resin. The space for the feed water inlet is provided by binding a plastic tubular material in parallel with hollow fiber membranes, and then pulling off the tubular material after curing the resin. This requires the additional task of pulling off the tubular material, and may also cause poor sealing if the resin for sealing the membranes in contact with the tubular material is removed together when pulling off the tubular material. Moreover, if a resin with high rigidity, such as epoxy resin, is used, the resin may crack while removing the tubular material. In addition, it is very difficult to locate the tubular material in a predetermined position by binding it with hollow fiber membranes. When inserting hollow fiber membranes with the tubular material being fixed at a predetermined position, the tubular material must be avoided while inserting the membranes, resulting in possible breakage of the membranes in contact with the tubular material.

Patent Document 2: JP S61-242607 A

Patent Document 3 discloses a hollow fiber membrane module comprising a number of porous hollow fiber membranes around a pipe with perforations in the side surface. In the module, at least one of the pipe and hollow fiber membrane bundles is housed in an outer cylindrical vessel while being fixed with an adhesive. This pipe, however, is equipped with a raw water inlet, an outlet for draining the liquid inside the vessel, and a cleaning air inlet for vibrating the hollow fiber membranes. This configuration requires opening and closing the valves, as well as switching flow paths for each filtration and cleaning cycle, thus complicating the operation of a filtration apparatus composed of this hollow fiber membrane module. Moreover, the location of the air release valve on the side surface of the vessel results in incomplete discharge of air from the module. This incomplete discharge of air further increases the possibility of suspended solids adsorbing onto the hollow fiber membranes.

Patent Document 3: JP H7-136469 A

Patent Document 4 discloses a method for manufacturing a hollow fiber membrane module. The method comprises inserting hollow fiber membrane bundles into a casing, attaching a temporary sealing cap to each end of the casing in the longitudinal direction of the casing, fixing only the ends of the membrane bundles by curing a resin inside the temporary caps, sealing the casing ends and membrane ends by adhesive curing, and removing the temporary sealing caps in the longitudinal direction of the casing.

Patent Document 4: JP H7-31852 A

Patent Document 5 discloses a hollow fiber membrane separating module. In this module, a number of hollow fiber membranes contained in the module casing are divided into two to seven bundles, each wound with a protective net. The ends of each bundle wound with a protective net are fixed to the module casing with an adhesive, while being separated from the ends of other bundles with a partition plate therebetween. Thus, in this module, one bundle is contained in one section. Whereas this kind of configuration is applicable to relatively small modules or modules with sections of specific shapes, it is difficult to apply to large modules or modules with sections of complicated shapes (shapes with relatively many acute angles).

Patent Document 5: U.S. Pat. No. 2,932,394

Patent Document 5 also discloses the technique of winding a protective net around bundles of hollow fiber membranes and accommodating the bundles in the module casing. Similarly, Patent Document 6 discloses the technique of preparing a module by binding hollow fiber membrane bundles with a tubular protective net and loading the bundles into a casing.

Patent Document 6: JP H2-203924 A

Patent Document 7 discloses a hollow fiber membrane filtration module having one end of the hollow fiber membranes sealed and the other end open. In this module, a tubular material with perforations in the side surface near the center of hollow fiber membrane bundles is fixed with an adhesive to the hollow fiber membrane bundles, with the end thereof opposite to the open end of the membranes being open. The aforementioned Patent Document 3 also discloses a hollow fiber membrane module comprising a pipe with perforations in the side surface, the pipe being used as a raw water inlet, an outlet for draining the liquid inside the vessel, and a cleaning air inlet. Both the tubular material and the pipe described in these patent documents serve as a raw water inlet.

Patent Document 7: JP S61-192310 A

Patent Document 8 discloses a hollow fiber membrane module containing hollow fiber membrane bundles provided with a fixed end, achieved by fixing both ends of a number of hollow fiber membranes with an adhesive. In this module, slits for introducing air are provided in the fixed end of the membrane bundles at the lower end of the module. Because the fixed end of the hollow fiber membrane bundles is shaped with an adhesive resin, the slits in the fixed end are made after the adhesive resin is cured, or by curing the adhesive together with a member with slits, and then pulling off the member. Providing slits by these methods poses problems such as the resin cracking during processing, damage to the hollow fiber membranes, and unstable product quality.

Patent Document 8: JP S61-106307 U

DESCRIPTION OF THE REFERENCE NUMERALS

Figure 1:
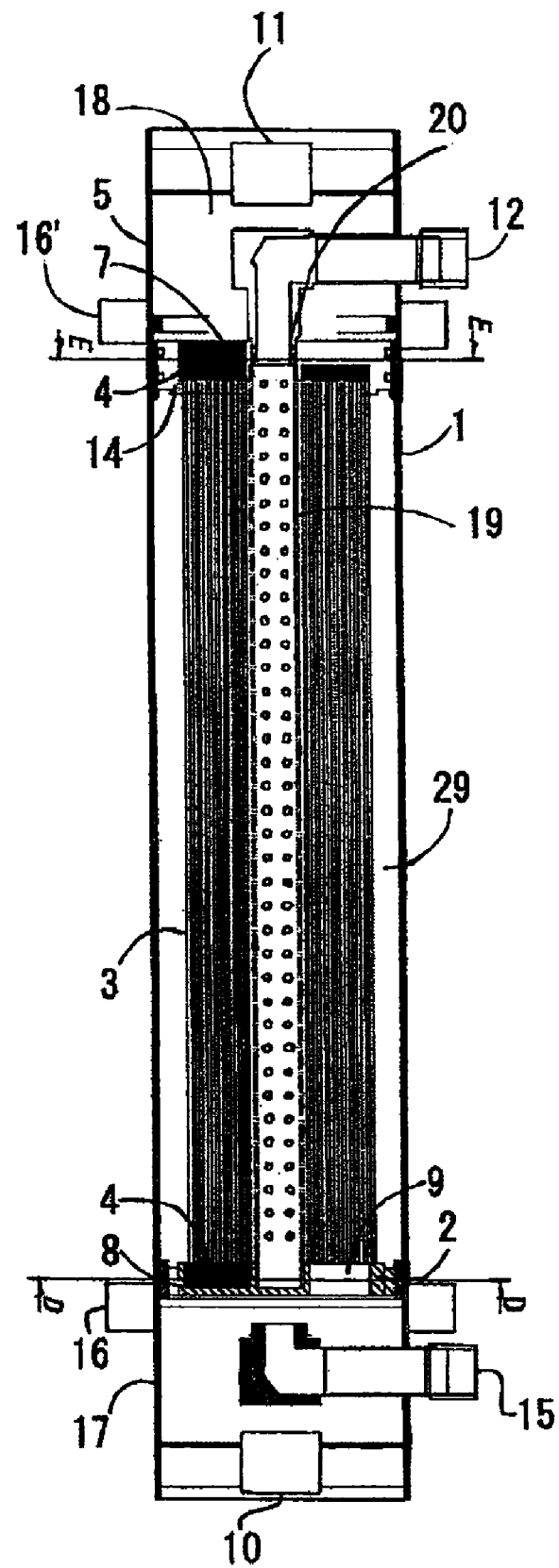
FIG. 1 shows a cross section of an example of the permselective membrane module according to the invention.

1: vessel
2: lower holder
3: hollow fiber membranes
4: adhesive resin
5: membrane module cap
6: packing
7: module open end surface
8: module sealing end surface
9: slits
10: raw water inlet
11: filtrate outlet
12: cleaning wastewater outlet
13: sections
14: upper holder
15: air feed nozzle
16: coupling bands
17: lower cap
18: filtrate chamber
19: cleaning pipe
20: cleaning pipe connector
21: raw water tank
22: raw water feed pump
23: filtrate tank
24: backwash pump
25: cleaning wastewater drain pipe
26: filtrate feed pipe
27: raw water feed pipe
28: compressor
29: membrane filtration chamber
30: stays
31: outer peripheral ring
32: projections
33: bottom
34: element
35: outer peripheral slits
36: cleaning pipe connector
37: chemical tank
38: chemical injection tank

DISCLOSURE OF THE INVENTION

Problem to be Solved by the Invention

The present invention aims to solve prior art problems as described above, thus providing an outside-in type hollow fiber membrane module structure which allows, even when increased in size, scrubbing air to be delivered to the hollow fiber membranes located near the center, and efficient discharge from the module of suspended solids that have been peeled from the membrane surface during cleaning, while also being easy to manufacture and unlikely to suffer from defects during the manufacturing process.

Means for Solving the Problem

The present inventors conducted extensive research to overcome the aforementioned problems, thereby accomplishing this invention. The present invention includes the following elements:

(1) A method for manufacturing a permselective membrane module, the module including permselective membranes housed in a vessel with both ends of the membranes being fixed; the method comprising:

fixing both ends of the permselective membranes with an upper holder and a lower holder, the holders connected with at least one cleaning pipe; and subsequently placing in a vessel the membranes fixed with the holders connected with a cleaning pipe.

(2) The method according to Item 1, wherein the upper and lower holders are made of a premolded metal or plastic.

(3) The method according to Item 1 or 2, wherein the lower holder is provided with slit holes for introducing scrubbing air.

(4) The method according to any of Items 1 to 3, wherein the upper and lower holders are provided with sections for fixing the permselective membranes.

(5) The method according to any of Items 1 to 4, wherein permselective membranes are inserted into each section of the upper and lower holders and fixed by bonding with a resin.

(6) The method according to any of Items 1 to 5, wherein a plurality of projections are provided on the side surface of the lower holder, so as to come into contact with the inner surface of the vessel.

(7) The method according to any of Items 1 to 6, wherein the permselective membranes are hollow fiber membranes.

(8) The method according to Item 7, wherein the hollow fiber membranes are divided into a plurality of bundles.

(9) The method according to Item 8, wherein each bundle is wound with a protective net.

(10) A permselective membrane module, which is produced by the method according to any of Items 1 to 9.

EFFECTS OF THE INVENTION

In the method for manufacturing a permselective membrane module according to the invention, the use of premolded holders can remarkably improve the production yield, durability, and quality of the module. Moreover, the permselective membrane module produced by the method of the invention allows suspended solids to effectively float over the membrane surface, while being excellent at discharging the suspended solids from the system, thus resulting in a reduction in cleaning costs. In addition, excellent performance recovery of the permselective membrane module can lengthen the element life. Furthermore, the replacement of membranes involves only the replacement of an element, thereby reducing the water filtration cost.

BEST MODE FOR CARRYING OUT THE INVENTION

The present invention will be described in detail below.

The invention relates to a method for manufacturing a permselective membrane module, and permselective membrane modules manufactured by the method. Components constituting a permselective membrane module, types of adhesives, materials of permselective membranes and the like are not limited. For example, permselective membranes such as microfiltration membranes, ultrafiltration membranes and the like are widely applicable when the module is used to purify raw water containing suspended matter, such as river water, lake water, ground water, seawater or the like, in order to use the purified water as tap water or industrial water, or when the module is used as pretreatment to a reverse osmosis membrane system for seawater desalination. These membranes are available in a wide range of shapes, such as flat sheet membranes, hollow fiber membranes, tubular membranes, etc., and any of these types are usable as permselective membranes for use in the permselective membrane module according to the invention. In the invention, hollow fiber membranes are preferred. In the case of hollow fiber membranes, the inner diameter is preferably from 200 to 1200 μm, and the outer diameter is preferably from 300 to 2000 μm, in consideration of the ease of cleaning. If the outer diameter of the hollow fiber membranes is too small, the membranes may become weak and easily break during processes such as backwash, resulting in limited conditions and cleaning frequency. Conversely, if the outer diameter is too large, the membrane area per volume decreases to increase the amount of filtered water per membrane area for producing the same amount of filtrate. This increases the build-up of suspended solids on the surface of the hollow fiber membranes, and increases the rigidity of the hollow fiber membranes, which prevents shaking of the hollow fiber membranes during backwash, resulting in a smaller amount of removed suspended solids and the like deposited on the surface of the membrane.

Cross-flow filtration has previously been employed in filtration using membranes such as microfiltration (MF) and ultrafiltration (UF) membranes. In cross-flow filtration, fouling layers, such as gel and cake layers, formed on the membrane surface are peeled off by the flow of a feed liquid, and the filtration performance is stabilized in a state where the build-up caused by filtration and the removal caused by the flow are in equilibrium. In this technique, however, increasing the filtrate flow rate decreases the force for removing the fouling layers, thereby requiring a somewhat excessive flow of feed liquid. Moreover, because the disposal of the concentrate of unfiltered components without any treatment decreases the entire recovery ratio, the concentrate is returned into the feed water again for circulation. This causes problems such as increased pump power consumption due to increases in the pump flow of the feed liquid, a complicated apparatus structure due to an increased number of pipes in the concentrate reflux system, and increased equipment costs. In dead-end filtration, on the other hand, all of the feed liquid is filtered, with a recovery rate of 100% during the filtration process. In the treatment of water containing suspended matter, however, components that have not permeated through the membranes accumulate on the membranes, resulting in a gradual decrease in membrane filtration performance. Backwash is thus required. A simple and efficient membrane filtration system which provides a high recovery ratio and produces little wastewater can be attained by successfully improving the backwash efficiency to reduce the amount of process water consumed during backwash, thereby producing a highly concentrated membrane-filtration wastewater. Therefore, dead-end filtration is desirable.

Figure 2:
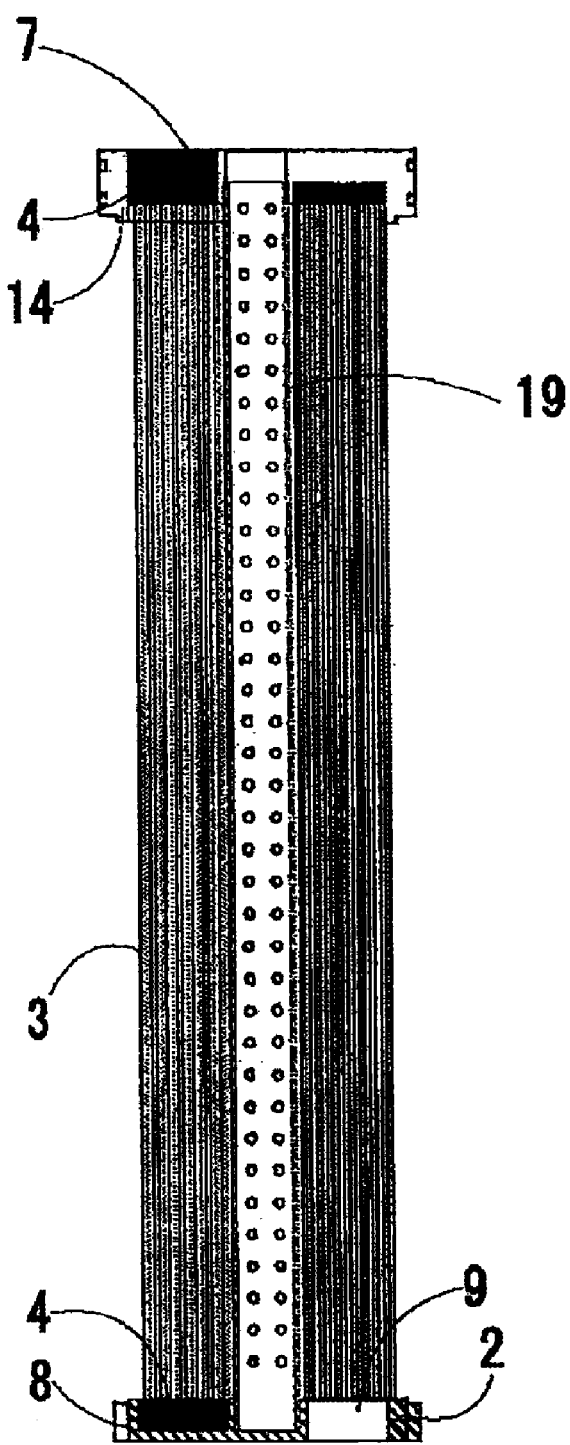
FIG. 2 is a diagram showing an example of the element according to the invention.
Figure 5:
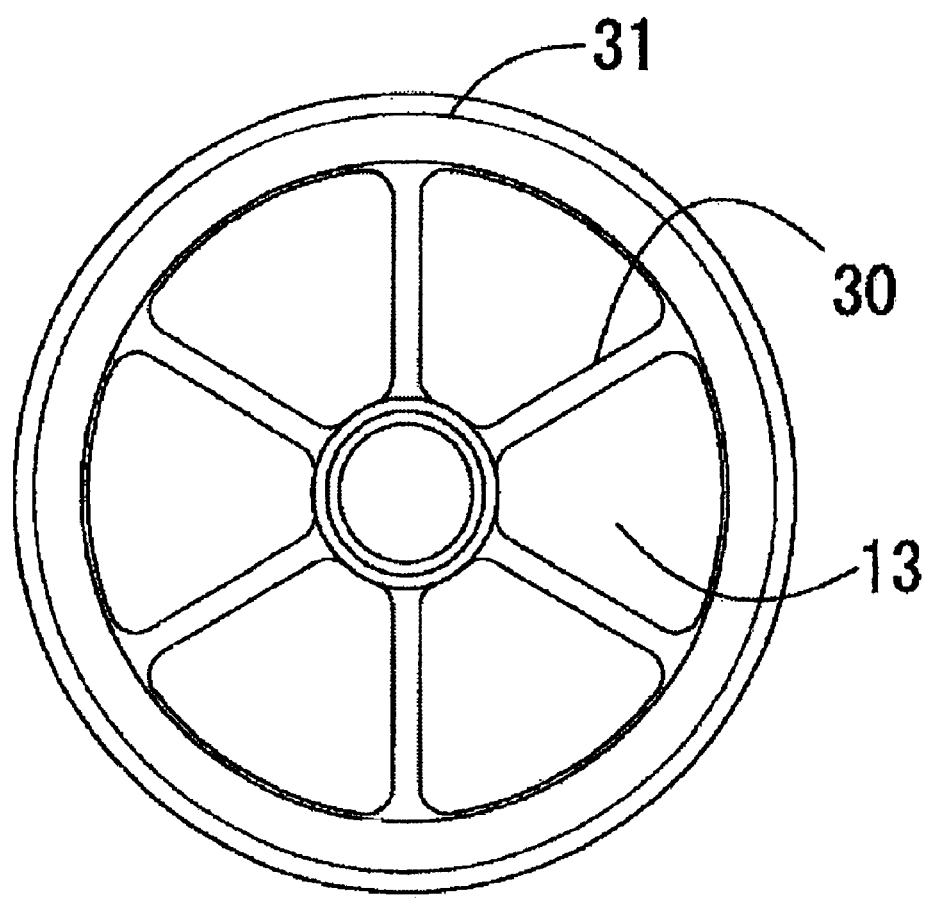
FIG. 5 is a plan view showing an example of the upper holder according to the invention.
Figure 6:
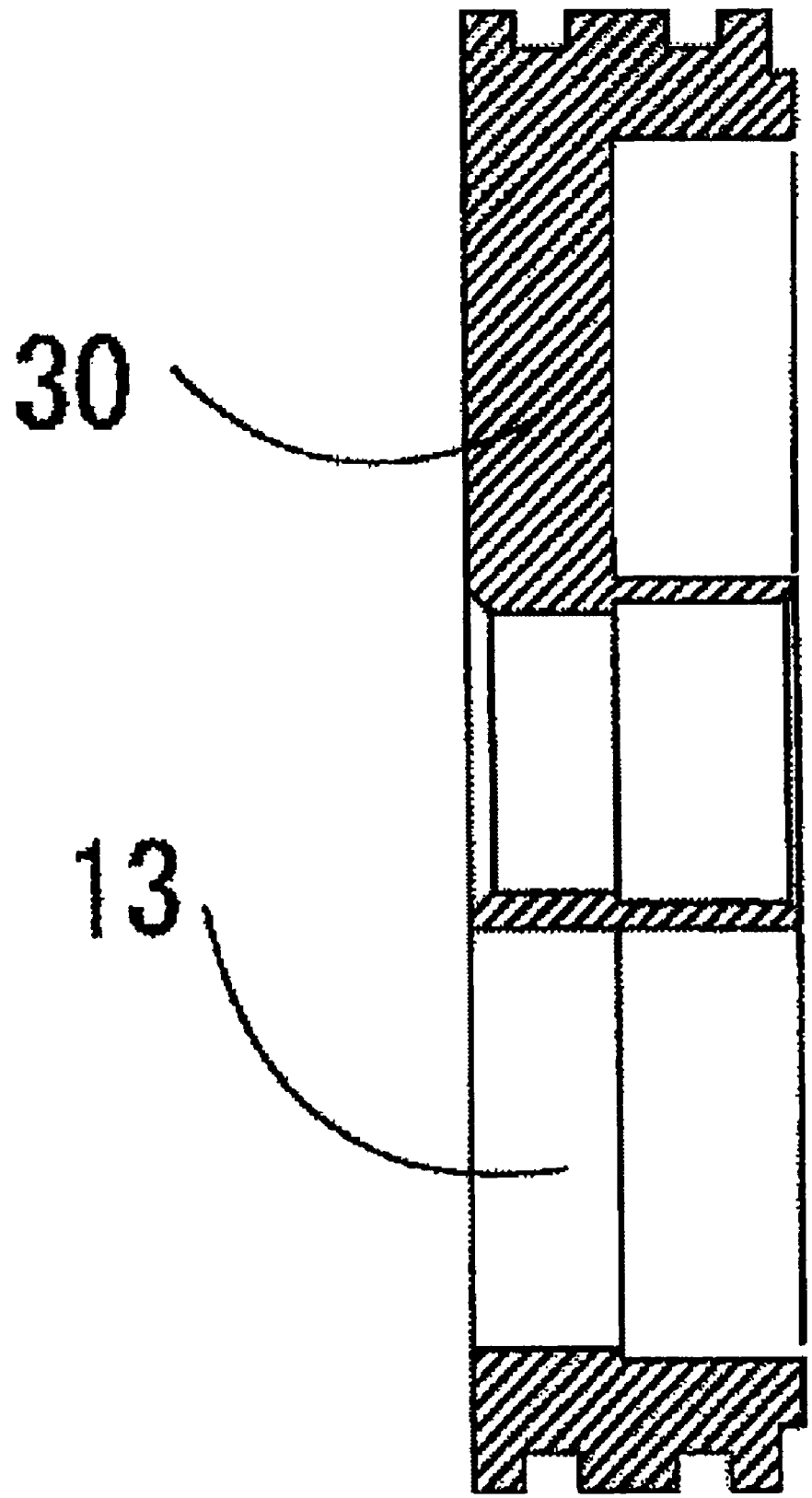
FIG. 6 shows a cross section of an example of the upper holder according to the invention.

An example of the permselective membrane module according to the invention is described below. A lower holder 2, shown in FIGS. 3 and 4, and an upper holder 14, shown in FIGS. 5 and 6, are connected with a cleaning pipe 19, as shown in FIG. 2. Each of the lower holder 2 and upper holder 14 has sections 13 divided with stays 30. The sections 13 of the upper holder 14 are open, while the lower holder 2 has a bottom portion 33, fixed in such a position that the sections 13 are aligned in parallel. A hollow fiber membrane bundle 3, which is composed of a predetermined number of hollow fiber membranes bound with a resin net, is inserted into each section 13, and then secured to the upper and lower holders with an adhesive resin 4. The upper-holder side of the hollow fiber membrane bundles 3 and a portion of the adhesive resin 4 are cut to provide an open end. The resulting component is referred to as "element 34" shown in FIG. 2. As shown in FIG. 1, the element 34 is inserted into a vessel 1, and then a lower cap 17 and an upper cap 5 are attached to the vessel with coupling bands 16, 16', respectively. This structure is referred to as a module. The upper cap 5, which includes a filtrate chamber 18 and a cleaning-pipe connector 20, prevents mixing of the filtrate and cleaning wastewater via a sealing member. Each of the filtrate outlet 11 and the cleaning wastewater outlet 12 can be positioned on an upper portion or on the side surface of the upper cap 5, according to the customer's request.

A module thus prepared is vertically installed to perform filtration. Raw water supplied via the raw water inlet 10 passes into the hollow fiber membrane bundles 3 through the slits 9 in the lower holder 2 and the outer peripheral slits surrounded by the lower holder 2, vessel 1, and projections 32. Filtrate that has permeated through the hollow fiber membranes passes through the upper open end of the membranes, and is collected in the filtrate chamber 18, after which it flows out of the module via the filtrate outlet 11.

In the treatment of water containing suspended matter, the higher the permeability of the permselective membranes is, the lower the pressure at which filtration can be performed, which is advantageous in terms of the power required for the feed pump. However, increasing permeability generally involves increasing the pore diameter of the membranes, causing larger substances to enter into the membrane pores, thus possibly lowering the separation efficiency and performance retention. Moreover, increasing the permeability also increases the water treatment capability per module, so that the increase in the filtrate per unit area increases the accumulation of suspended solids on the membrane surface, thereby possibly lowering the backwash performance. For this reason, in the case of ultrafiltration (UF) membranes, permeability is preferably from 50 to 1000 $L/m^2/hr/100$ kPa, more preferably from 100 to 950 $L/m^2/hr/100$ kPa, and still more preferably from 150 to 900 $L/m^2/hr/100$ kPa. In the case of microfiltration (MF) membranes, permeability is preferably from 1000 to 7000 $L/m^2/hr/100$ kPa, more preferably 1100 to 6000 $L/m^2/hr/100$ kPa, and still more preferably from 1200 to 5000 $L/m^2/hr/100$ kPa.

Membranes with various configurations are usable, such as membranes having dense layers formed over the outer and inner surfaces, and having microvoids or a fingerlike structure in the center; asymmetric membranes that are inclined so that the pore diameter increases from one surface to the other, whereby suspended solids inside the membranes are easily removed outwardly by procedures such as reverse filtration; and homogeneous membranes that have a uniform sponge-like configuration. In the treatment of water containing suspended solids, a sponge-like configuration is preferred, in which suspended solids are unlikely to enter into the membranes. With outside-in type permselective membranes, the outer surface of a membrane preferably has a dense layer to prevent suspended solids from entering into the membrane.

The strength of the hollow fiber membranes is preferably such that the fracture strength per hollow fiber membrane is 100 g or more, in order to prevent leakage caused by breakage during filtration or backwash. The module according to the invention is configured to minimize the perpendicular flow to the hollow fiber membranes, thereby preventing the application of excessive force; however, in order to enhance the effect of backwash, the flow rate must be sufficient to shake the membranes in order to force fouling away from the surface. This may cause force to concentrate at the root of each adhesion part of the hollow fiber membranes, in particular, at the root of the upper adhesion part when the module is vertically mounted, resulting in possible damage or breakage of the membranes. Hence, the fracture strength per hollow fiber membrane is preferably 150 g or more, and more preferably 200 g or more.

Various membrane materials are usable as hollow fiber membranes. Examples of materials include cellulose ester resins such as cellulose acetate; polyolefin resins such as polyethylene and polypropylene; polysulfone resins such as polysulfone and polyethersulfone; halogen-containing resins such as polyvinyl chloride, polyvinylidene fluoride and polytetrafluoroethylene; polyacrylonitrile; and the like. Polyethylene, polysulfone, polyethersulfone, polyvinylidene fluoride and the like are preferred in consideration of their good chemical durability against chlorine-containing chemicals frequently used in membrane cleaning and chemicals such as acids and alkalis, as well as their good dynamic durability against physical cleaning procedures such as reverse filtration and scrubbing.

Hollow fiber membranes in the membrane filtration module may be arranged either in parallel or in a crisscross fashion. In order to allow efficient removal of suspended solids attached to the outer surface of the membranes during backwash, the hollow fiber membranes are preferably caused to shake or vibrate slightly due to the flow. In a crisscross arrangement, the hollow fiber membranes are arranged in a fixed manner, so that the water passage during backwash becomes fixed, causing the water to flow unevenly and making it difficult to clean the entire membrane surface. The hollow fiber membranes may also be crimped to reduce contact between membranes.

The ratio of the hollow fiber membranes contained in the membrane filtration chamber 29 of the module is an important factor for ensuring a satisfactory volumetric efficiency of membrane filtration and satisfactory backwash performance. The volume ratio of the hollow fiber membranes to the membrane filtration chamber must be from 30 to 60 vol %, and preferably from 40 to 55 vol %. If the filling ratio is less than 30 vol %, the filtrate flow rate per unit pressure may decrease, which is disadvantageous in terms of the module volume, footprint, and pump power consumption. Conversely, if the filling ratio is too high, the amount of backwash water required at the same pressure may increase, thereby increasing the force applied to the membranes during discharge. In addition, the movement of the membranes may become less, which stabilizes variations in the density of packed membranes. The resulting uneven flow of backwash water prevents areas of closely packed membranes from being washed, causing an accumulation of solids to lower the membrane performance.

The material of the holders for fixing the hollow fiber membranes is not limited, but is preferably the same as that of the vessel. The upper and lower holders may be made of the same or different materials. Specific examples of usable materials include polyvinyl chloride, polycarbonate, polysulfone, polyethersulfone, polyvinylidene fluoride, polyethylene, polyethylene terephthalate, polybutylene terephthalate, nylon, polyacetal, polyphenylene sulfide, ABS resin, polyoxymethylene and the like. Metals such as stainless steel and aluminum are also usable. Polyvinyl chloride is preferable in consideration of its good workability and inexpensive cost. The use of premolded holders remarkably improves the production yield, durability, and quality of the module.

Figure 3:
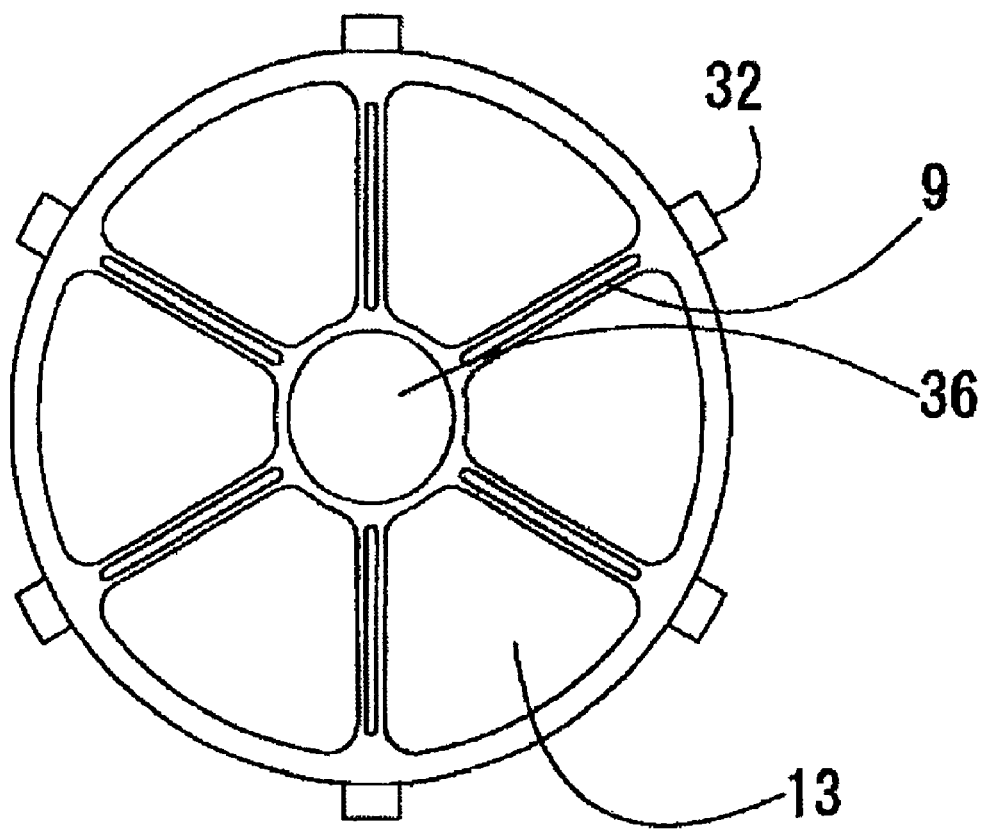
FIG. 3 is a plan view showing an example of the lower holder according to the invention.
Figure 4:
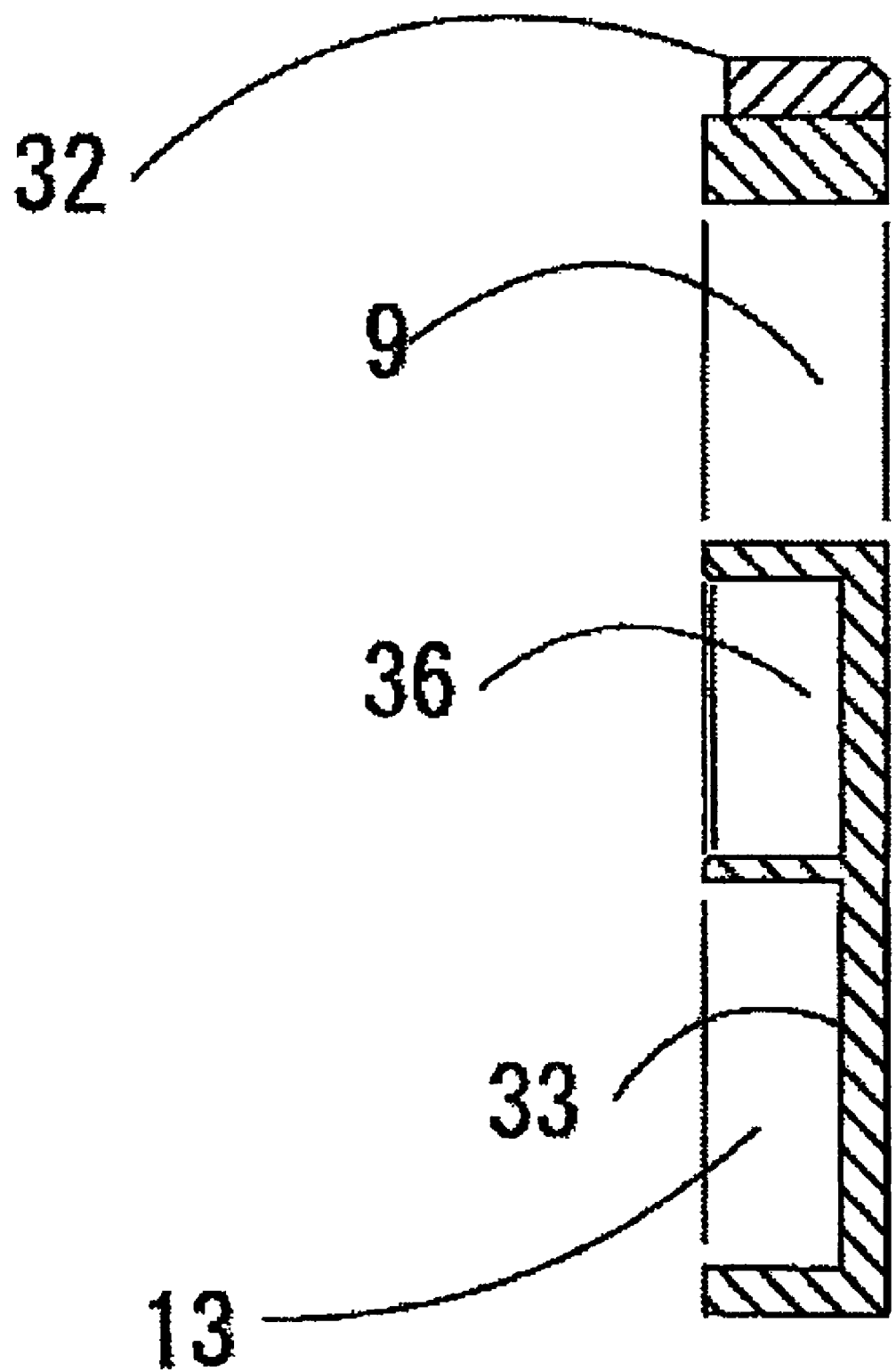
FIG. 4 shows a cross section of an example of the lower holder according to the invention.

The lower holder may, for example, have a configuration as shown in FIGS. 3 and 4. The lower holder shown in these figures includes slits 9 (inlets to allow bubbles into the module); sections 13 for receiving the hollow fiber membranes (bundles) (after the bundles of hollow fiber membranes are inserted into each section 13, resin is injected to fix the bundles); a cleaning-pipe connector 36 for connecting the cleaning pipe (connector 36 being configured to seal an end of the cleaning pipe); and projections 32 (having such a size that they contact the inner surface of the module vessel and allow raw water to be fed via the slits and gaps between the projections, inner periphery of the holder, and inner periphery of the vessel). The upper holder may, for example, have a configuration as shown in FIGS. 5 and 6, but is not limited to this configuration. The sections of the upper holder may be similar to the sections of the lower holder, or may be prepared beforehand as through-holes that penetrate the upper surface. The upper holder is not provided with projections. The upper holder is provided with through-holes so that the other end of the cleaning pipe is open.

The number of sections in each of the upper and lower holders for dividing the bundles of hollow fiber membranes is preferably three or more. If less then two, the efficiency of cleaning is not improved, making it meaningless to divide them into sections. Conversely, if there are too many sections, the size of a single section becomes small, and the number of intervals between the sections increases, thereby increasing the ratio of the area that is not filled with membranes relative to the cross-sectional area of the vessel. As a result, problems may arise such as a decreased filling ratio of the hollow fiber membranes or acutely angled top portions of the holders, which make it difficult to pack the hollow fiber membranes. The lower the filling ratio of the hollow fiber membranes is, the lower the permeability of the module becomes. Therefore, the number of sections of hollow fiber membrane bundles is preferably at least 3 and not more than 16, more preferably at least 4 and not more than 12, and still more preferably at least 5 and not more than 12.

The sections of the lower holder must have a depth such that the hollow fiber membranes (in bundles) can be fixed therein. As with the upper holder, the lower holder may be open in the thickness direction. The depth of the sections is preferably from 5 to 120 mm. If the depth is too shallow, the lower end of the membranes may not be sealed with an adhesive resin. Therefore, the depth of the sections is more preferably 7 mm or more, and still more preferably 10 mm or more, and even more preferably 15 mm or more. Conversely, if the depth is too deep, the holder itself becomes large, which may cause problems such as increased manufacturing costs, lowered filtration efficiency due to potential dead space, and the like. Therefore, the depth of the sections is more preferably 120 mm or less, and still more preferably 100 mm or less.

The shape, number, position, size and the like of the slit provided between adjacent sections are not limited as long as the slits allow scrubbing air (bubbles) to pass through smoothly, and enable the bubbles to be evenly distributed between hollow fiber membranes. The shape of the slits may be round, elliptic, polygonal, crescent, zigzag, or any other shape.

In the case of the slits 9 shown in FIGS. 3 and 4, for example, the width is preferably at least 1 mm and not more than 10 mm. If less than 1 mm, processing such as plastic molding becomes difficult. If more than 10 mm, when air is introduced via the center of the back of the hollow fiber membranes sealed with resin, most of the air rises from only some of the slits or near the center of the slits without reaching the end of the slits, which may lower the cleaning efficiency for the membranes around the outer periphery of the element 34. Therefore, the width of a slit between sections is more preferably at least 3 mm and not more than 8 mm.

The slits between sections extend radially from near the center of the lower holder, and have a length of at least 5% and not more than 90% of the radius of the cylindrical vessel. If 5% or less, the ratio of the slits in the cross-sectional area of the vessel may become small, the pressure loss during feeding of raw water and air may become large, and the load on the pump for feeding raw water and that on the compressor for feeding air may become great. Conversely, if more than 90%, problems associated with strength arise, such as cracks from the slits and the like. In consideration of the above, the length of the slits is at least 5% and not more than 90% of the diameter of the cylindrical vessel. Preferably, the length is at least 10% and not more than 80% thereof. Within this range, each of the radial slits may be divided into any number.

The height of the slits must be such that the slits are not embedded in the adhesive resin. If the slits are too high, dead space forms, resulting in a lowered cleaning effect during air scrubbing and lowered filtration efficiency. Therefore, the height of the slits preferably does not exceed 30 mm. It is more preferably 25 mm or less, and still more preferably 20 mm or less.

The number of bundles contained in a single module preferably increases as the number of hollow fiber membranes increases (as the size of the module increases). For example, assuming that the number of hollow fiber membranes in the module remains the same, increasing the number of bundles may enhance filtration and cleaning efficiency, but make the manufacture of the module complex, possibly lowering production efficiency. An appropriate number of bundles is 4 to 60, depending on the module size and the number of hollow fiber membranes contained in the module. If the number of sections is too small, air will not easily pass between hollow fiber membranes during air scrubbing, possibly lowering the cleaning performance. Therefore, the number of bundles is preferably 5 or more, more preferably 6 or more, and still more preferably 7 or more. Conversely, if there are too many bundles, problems arise such as increased production costs, or inability to increase the membrane filling ratio in the module. The number of bundles is thus preferably 60 or less, more preferably 55 or less, and still more preferably 50 or less.

The number of hollow fiber membranes in a single bundle is preferably from 500 to 2000. If the number of hollow fiber membranes is too small, the ratio of the protective net increases and the density of the packed hollow fiber membranes decreases, thus lowering the permeability per module. Therefore, the number of hollow fiber membranes in a bundle is preferably 550 or more, and more preferably 600 or more. If the number is too large, the membranes become bound so tightly with the protective net that shaking of the membranes is unlikely to occur during cleaning by air scrubbing, thereby reducing the cleaning efficiency. Another concern is damage to the hollow fiber membranes due to friction with the protective net during the shaking of the membranes. Therefore, the number of hollow fiber membranes in a bundle is preferably 1900 or less, and more preferably 1800 or less.

The number of bundles contained in a single section is preferably 2 to 10, depending on the size of the module and the size (area) and shape of the section. If the number of bundles per section is too small, bubbles may not easily pass between hollow fiber membranes during air scrubbing. The number of bundles per section is thus preferably 3 or more, and more preferably 4 or more. Conversely, if the number is too large, bubbles may again not easily pass between hollow fiber membranes during air scrubbing. The number of bundles per section is thus preferably 8 or less, and more preferably 6 or less.

The size and shape of a single section are not limited, and should be determined in consideration of the shape of the slits and air scrubbing efficiency. The size and shape of the sections may be the same or different between the upper holder and lower holder.

The bundles are preferably wound with a protective net. A mesh material is preferably used as a protective net. The mesh size is preferably 0.1 to 10 mm, more preferably 0.3 to 7 mm, and still more preferably 0.5 to 5 mm. Examples of materials of the protective net include polyethylene, polypropylene, polyvinyl chloride, polyester, polyamide, polyvinylidene fluoride, polytetrafluoroethylene and the like, in consideration of their good solvent resistance and bacteria resistance. Among these examples, polyethylene is preferred.

The cleaning pipe for use in the invention serves as a drain pipe for draining bubbles and cleaning wastewater produced when cleaning the permselective membrane module. Therefore, the lower end of the cleaning pipe must be sealed. Sealing may be provided by any suitable means; for example, by using a non-porous lower holder or by filling the lower end with a resin. Examples of materials usable as the cleaning pipe include polyvinyl chloride, polycarbonate, polysulfone, polyethersulfone, polyvinylidene fluoride, polyethylene, polyethylene terephthalate, polybutylene terephthalate, nylon, polyacetal, polyphenylene sulfide, ABS resin, polyoxymethylene, FRP and the like. Metals such as stainless steel and aluminum are also usable. Polyvinyl chloride is preferable in consideration of its good workability and inexpensive cost. The same material as that of the holders is preferably used.

In the invention, the entire side surface of the cleaning pipe is preferably perforated. The number and size of perforations may suitably be determined depending on the permselective membrane module size, the membrane area of the module, the cleaning liquid flow rate, and the amount and size of bubbles during air scrubbing; however, the area of the overall perforations is preferably from about 0.5 to about 2 times the area of the open end of the cleaning pipe. The inner diameter of the cleaning pipe is preferably from about 0.1 to about 0.4 times the diameter of the module. If the inner diameter is too small, the drainage resistance increases when draining a waste cleaning liquid from the cleaning pipe to reduce the drainage capability, resulting in poor cleaning efficiency. The inner diameter of the cleaning pipe is thus preferably 0.15 times or more, and more preferably 0.2 times or more, the diameter of the module. Conversely, if the inner diameter is too large, the filling ratio of the cleaning pipe to the cross-sectional area of the module increases to decrease the number of hollow fiber membranes contained, thus lowering the permeability per module. Therefore, the inner diameter of the cleaning pipe is preferably 0.35 times or less, and more preferably 0.3 times or less, the cross-sectional area of the module. A plurality of cleaning pipes may also be used.

The membrane module vessel and the caps may be connected using screws, fixing flanges with bolts and nuts, or using coupling bands. If flanges are used, the diameter of the flanges becomes the maximum width in the module, so that the number of membrane modules that can be accommodated within a predetermined width decreases when modules are aligned in parallel, thus lowering the volumetric efficiency of the membrane module system. If screws are used, the screws may become loose during operation. If the upper cap is bonded to the vessel with an adhesive or the like, in the event that the hollow fiber membranes break, it is not possible to repair them by embedding the apertures of the broken membranes. Therefore, coupling bands are preferably used.

Elements for use in the permselective membrane module according to the invention are manufactured as described below. Hollow fiber membranes obtained in the membrane manufacturing process are cut to a predetermined length and dried. The dried hollow fiber membranes are tied in bundles, and each bundle is put into a protective net. Upper and lower holders connected with a cleaning pipe are prepared, and a predetermined number of bundles are inserted into each section of the holders.

An adhesive resin is then poured into the seal end and open end of the holders to fix the bundles. When the hollow fiber membranes (bundles) are fixed to the holders with an adhesive resin, the resin may be fed to the adhesion part by means of centrifugal force or by gravity flow without applying any force. Examples of usable adhesive resins include, but are not limited to, epoxy, urethane, silicone and the like. To improve adhesion between the holders and the resin, it is preferable that the surface of each holder bonded to the resin is roughened with a grinder, sandpaper, or the like. The open end is provided by cutting a portion of the cured resin and the hollow fiber membranes using a machine such as a guillotine cutter, lathe, miller or the like, so as to obtain an element.

The element thus prepared is placed in a vessel 1, mounted on a lower cap 17, and fixed with coupling bands 16. Clear water not containing suspended solids is passed via a raw water inlet 10 to fill a membrane filtration chamber 29. With a plug being inserted into the upper end of the cleaning pipe, air is introduced via an air feed nozzle 15. The air causes the water in the membrane filtration chamber 29 to pass through the hollow fiber membranes and exit from the element via the open end 7, so that the membrane filtration chamber 29 is air purged. In case of any breakage or defects in the hollow fiber membranes, air comes out from the open surface 7 in the form of bubbles, thereby allowing defects to be detected. After repairing such defects, an airtight element 34 is obtained.

The permselective membrane module according to the invention is cleaned in the manner described below. Since filtration is carried out using a dead-end filtration technique, suspended matter contained in raw water gradually accumulates on the outer surface of the membranes. Thus, in the case of constant pressure operation, the amount of filtrate gradually decreases; and in the case of constant flow rate operation, the differential pressure between membranes increases, resulting in the need to elevate the pressure feed. Backwash is carried out when, during constant pressure operation, the amount of filtrate has decreased below the set value; and when, during constant flow rate operation, the differential pressure between membranes has increased above the set value. If the quality of raw water is stable with a relatively low concentration of suspended solids, backwash can be carried out at regular intervals. In the invention, any of the foregoing methods of backwash can be used.

Permselective membrane modules for water filtration are typically employed in outside-in, dead-end filtration, which causes the deposition of suspended solids on the outer surface of the permselective membranes, thereby reducing the filtrate flow rate. The recovery of the filtrate flow rate requires periodical removal of the deposit of suspended solids on the membrane surface. In the invention, air scrubbing is performed via the lower portion of the module, and simultaneously, part of the resulting filtrate is flowed in the opposite direction, i.e., from the inside of the hollow fiber membranes to the outside. The effect achieved by this method is as follows: the hollow fiber membranes are vibrated by the rising of bubbles between membranes, and permeate is simultaneously forced to flow from the inside of the membranes to the outside. This causes suspended solids to float from the membrane surface and adsorb onto the bubbles, which are then discharged, together with the water, from the module via the cleaning pipe 19. This prevents suspended solids from re-adsorbing onto the membrane surface, and prevents suspended solids from remaining near the hollow fiber membranes.

Figure 7:
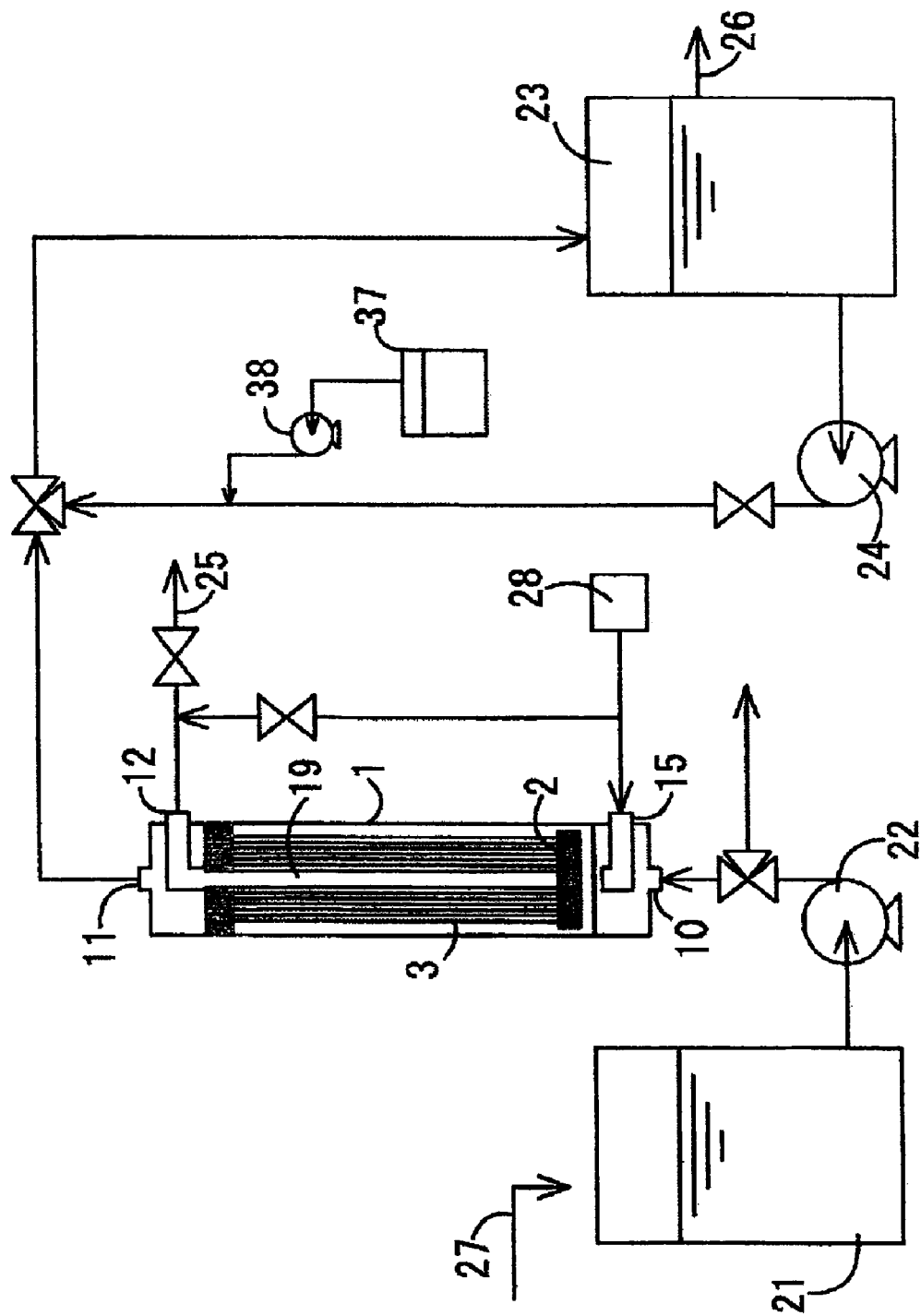
FIG. 7 is a diagram showing an example of a water filtration system comprising the permselective membrane module according to the invention.
Figure 8:
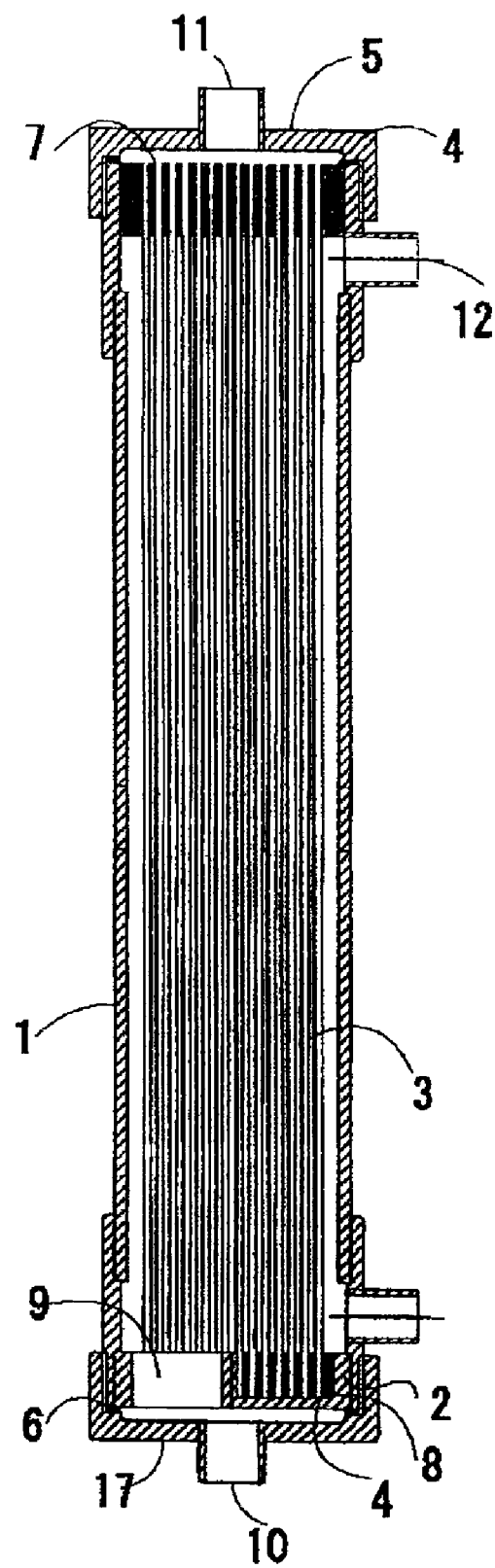
FIG. 8 shows a cross section of an example of a conventional permselective membrane module.

FIG. 7 is a diagram showing an example using a cleaning system of the permselective membrane module according to the invention. In usual filtration, raw water is fed from the raw water tank 21 via the raw water feed pump 22 into the permselective membrane module. The filtrate obtained through the module is stored in the filtrate tank 23. Membrane backwash is performed by reverse filtration in which the filtrate in the filtrate tank 23 is fed toward the inside of the hollow fiber membranes via the filtrate outlet 11 using the backwash pump 24 the filtrate outlet 11, thereby peeling off the suspended solids over the surface of the membranes. The pressure of the cleaning water is preferably from 0.01 to 0.3 MPa, being equal to or higher than the pressure during filtration. If the pressure of the cleaning water is too low, the water may not spread over the entire hollow fiber membranes, resulting in uneven cleaning with poor efficiency. If the pressure is too high, the feed pressure may exceed the pressure resistance of the membranes, causing deformation of the membranes, lowered permeability due to structural changes, and breakage in fragile areas of the membranes accompanied by leakage therefrom. At the bonded interface, in particular, the shape of the area of bonded hollow fiber membranes is fixed with resin, while the area without resin deforms by expansion, causing a shear force at the resin interface. Because polymer membranes are relatively susceptible to shear force, the repetition of such a situation may result in the breakage of hollow fiber membranes with leakage therefrom. For these reasons, the pressure during reverse filtering is preferably set within the aforementioned range. Filtrate can be used as cleaning water. If necessary, chemicals such as sodium hypochlorite can be added to the cleaning water, using a chemical tank 37 and a chemical injection pump 38. Examples of usable chemicals, in addition to sodium hypochlorite, include, but are not limited to, oxidizing agents such as hydrogen peroxide; reducing agents such as formalin; acids such as nitric acid, phosphoric acid, hydrochloric acid, sulfuric acid and citric acid; alkalis such as sodium hydroxide and sodium carbonate; chelating agents such as ethylenediaminetetraacetic acid (EDTA); a variety of surfactants; and mixtures thereof. For example, if sodium hypochlorite is added when polyethersulfone membranes are used, sodium hypochlorite is preferably added in an effective chlorine concentration of about 1 to about 50 ppm. Note, however, that the required concentration needs to be set depending on the material of the membranes and the characteristics of the raw water.

Compressed air is simultaneously supplied via the air supply nozzle 15 of the lower cap 17, and passed through the slits in the lower holder for air scrubbing. More specifically, bubbles cause the hollow fiber membranes (bundles) to vibrate, and the force of the bubbles rising over the membrane surface causes the suspended solids that have been removed from the membrane surface to flow upward. The floating suspended solids pass through the cleaning pipe 19, together with the reverse filtration cleaning water and rising bubbles, and are discharged outside the module from the cleaning wastewater outlet 12 of the upper cap 5. The pressure of the compressed air is preferably from 0.01 to 0.3 MPa. The amount and the rising speed of the bubbles depend on the difference in pressure between the cleaning water and the compressed air. Therefore, the pressure of the compressed air must be higher, with the pressure difference between them being preferably from 0.01 to 0.2 MPa. Bubbles tend to collect in the upper portion of the module; however, sluggish flow may cause re-adsorption of suspended solids to the permselective membranes. Therefore, care should be taken so that the bubbles that adsorb and push upward the solids may smoothly pass into the cleaning pipe. When a cleaning pipe is not used, cleaning wastewater is drained through a drain outlet disposed on the side of the vessel. In this case, however, although the wastewater near the drain outlet is predominantly discharged, the wastewater containing suspended solids flowing near the outer periphery of the upper part of the vessel is not easily discharged. Locating a cleaning pipe at the center of the module vessel enables cleaning wastewater to be uniformly discharged in the circumferential direction.

After this, air from the compressor 28 is introduced via the cleaning wastewater outlet 12 of the upper cap 5, thereby draining via the cleaning pipe 19 all of the cleaning wastewater in the membrane filtration chamber from the raw water inlet 10. This allows complete drainage of the waste cleaning water, and subsequent filtration to be started. When draining, the pressure of the air is preferably from 0.01 to 0.2 MPa.

EXAMPLES

The invention will be described in greater detail below with reference to the Examples, which are not intended to limit the invention.

Method of Measuring Inner and Outer Diameters of Hollow Fiber Membranes

The inner and outer diameters of hollow fiber membranes were measured as follows. A metal plate about 1.5-2 mm in thickness with holes of 2-3 mm in diameter was prepared first, and then hollow fiber membranes were inserted into each hole in such a number that they would not drop through due to gravity. The hollow fiber membranes were cut along both side surfaces of the plate with a razor to yield measurement samples. These samples of hollow fiber membranes were observed with a Profile Projector V-12A, manufactured by Nikon, by moving a stage capable of measuring 1 μm movements, and recording the outer and inner diameters of the hollow fiber membranes in two perpendicular directions. Five to ten hollow fiber membranes were measured, and the averages of the inner and outer diameters of these membranes were calculated.

Method of Measuring Filling Ratio

The filling ratio was calculated by $Vh/Vr \times 100(\%)$, which is the ratio of the volume (Vr) of the filtration chamber, surrounded by the inner wall of the vessel, partitions, surface of the cleaning pipe, and adhesion portions, relative to the reference volume (Vh) of the outer diameter of hollow fiber membranes, calculated from the membrane outer diameter, membrane effective length, and the number of membranes in each section of the filtration chamber.

Method of Measuring Permeability

The permeability was evaluated as follows using pure water. Pure water with a turbidity of 0.005 mg/L or less produced with a reverse osmosis membrane system was fed into the membrane module at a feed pressure of about 100 kPa at room temperature, and passed through the module for 30 minutes. The water temperature, feed pressure and filtrate flow rate were then measured, and these measurements were normalized to the filtrate flow rate per unit area at 25° C. and 100 kPa ($L/m^2/hr/100$ kPa). The flow rate was normalized to the flow rate at 25° C. on the ratio between the viscosity of pure water at 25° C. and the viscosity at the temperature at which the filtrate flow rate was measured. The filtrate flow rate during use was similarly normalized to the filtrate flow rate per unit area at 25° C. and 100 kPa, based on the water temperature, feed pressure and filtrate flow rate.

Method of Measuring Fracture Strength

The tensile strength of hollow fiber membranes was measured using a tensilon universal tensile testing machine (UTM II manufactured by Toyo Baldwin) as follows. A single dry hollow fiber membrane was cut to a length of 10 cm and mounted on the machine, and the strength at break (g) and stretch ratio (elongation) (%) were measured at a crosshead speed of 10 cm at a temperature of 20±5° C. and a humidity of 60±10% RH. Ten hollow fiber membranes were measured, and the averages of the fracture strengths and fracture elongations of these membranes were determined. Note, however, that the data of samples fractured in the chuck were excluded, and only the data of samples fractured at places other than the chuck were employed.

Preparation of a Test Module

For evaluation of the rejection performance of permselective hollow fiber membranes, a test module with a membrane area of 0.1 to 0.5 m$^2$ was prepared. A polycarbonate vessel was prepared having a tubular shape with an inner diameter of 33 mm and a length of 245 mm, and having two side ports on the side surface thereof. Into this vessel were inserted 100 to 500 dry hollow fiber membranes, and adhesive resin-forming members were attached to both ends of the membranes, after which the ends were bonded with urethane resin by centrifugal force. At least one of the bonded end surfaces was cut, thereby yielding a test module having open-ended hollow fiber membranes.

Evaluation of Protein Rejection Performance

For measuring the rejection performance of permselective hollow fiber membranes, proteins were used such as insulin (Mw: 6,000), cytochrome C (Mw: 13,400), chymotrypsinogen (Mw: 23,000), ovalbumin (Mw: 43,500), albumin (Mw: 67,000), aldolase (Mw: 148,000), gamma globulin (Mw: 160,000), catalase (Mw: 230,000), fibrinogen (Mw: 340,000), ferritin (Mw: 440,000), and the like.

For use as a solution for measuring the rejection performance, a phosphate buffer was prepared containing, per liter of pure water, 2.72 g of monopotassium phosphate and 10.75 g of disodium phosphate, each being analytical reagent grade, and this buffer was adjusted such that the concentration of proteins to be measured would be 0.01 to 0.03 wt %, thereby giving a measurement solution.

In measuring the rejection performance of the membranes, an apparatus was used which includes a chemical tank having about a 5 L tank with a stirring means located in a temperature-controllable thermostatic water bath, thereby enabling the temperature of the protein solution to be controlled at 25° C.; a feed liquid pump that ensures a discharge volume of 2 L/minute; a pipe that forms a flow path, which connects one side port of the test module with the chemical tank and the feed liquid pump, and returns from another side port to the chemical tank; a manometer for measuring the pressure at the test module inlet, the manometer being connected to a pipe branched from a pipe upstream from the flow path-forming pipe passing through the one side port of the test module; and a flow control valve disposed midway along the pipe passing through the other side port of the test module. Moreover, a filtrate return path was provided which collects the filtrate that has passed through the test module and exits from the open end, and returns it to the chemical tank, while having a port through which filtrate can be sampled.

As preparation for measurement, the test module was washed with water, and filled with the aforementioned phosphate buffer free of proteins. The phosphate buffer was then discharged to impregnate the hollow fiber membranes with the phosphate buffer, after which the test module was mounted on the measuring apparatus.

The measurement was conducted as follows. Five liters of a measurement solution containing target proteins was poured into the chemical tank of the aforementioned evaluation apparatus. After confirming that the temperature was set at 25° C., the flow control valve was fully opened, the feed liquid pump was operated, and the measurement solution was fed into the test module and circulated through the module back into the chemical tank, while the filtrate was returned to the chemical tank via the filtrate return path. This total circulation operation was carried out for 5 minutes. After this, using the flow control valve, the pressure at the inlet located upstream from the one side port of the test module was adjusted to 0.03 MPa, and then the operation was continued for 30 minutes. The measurement solution in the chemical tank was sampled as a raw liquid, and the filtrate was also sampled as filtrate.

The protein concentration of each of the raw liquid and the filtrate was measured as follows. Using a general ultraviolet spectrophotometer, the absorbance was measured at a wavelength of 490 nm for cytochrome C, and at a wavelength of 280 nm for other proteins, and then the concentration was determined from the absorbance using the calibration curves prepared from protein solutions of known concentrations.

The protein rejection rate (Rp) was calculated by Rp=(1−(filtrate concentration/raw liquid concentration))×100.

The protein rejection rate was measured for each protein, and the relation between the molecular weight and the rejection rate of each protein used was plotted on a graph to form a smooth curve. The molecular weight at a rejection rate of 90% was read from the graph, and this molecular weight was determined as the molecular weight cut-off of the measured permselective membranes.

Evaluation of Uniform Latex Rejection Performance

For measuring the rejection performance of the permselective membranes, uniform polystyrene latex with particle diameters of 0.021 μm, 0.028 μm, 0.039 μm, 0.049 μm (each manufactured by Magsphere Inc.), 0.083 μm, 0.112 μm, or 0.230 μm (each manufactured by Seradyn Inc.) were used.

Solutions with a polystyrene concentration of about 10 ppm, obtained by diluting 10% raw liquids by a factor of 10,000, were used as rejection performance measurement solutions.

The measurement was conducted on the aforementioned solutions of uniform latex with different particle diameters, using the same apparatus and procedures as in measuring the protein rejection performance.

In measuring the uniform latex concentrations, a general ultraviolet spectrophotometer was used to measure the absorbance at the wavelength of 220 nm for particles with diameters of less than 0.1 μm, and the absorbance at the wavelength of 230 nm for particles with diameters of 0.1 μm or more, and then the concentrations were determined using the calibration curves prepared beforehand from the relations between the absorbance and concentration of solutions with various particle diameters.

The uniform latex particle rejection rate (Rl) was calculated by Rl=(1−(filtrate concentration/raw liquid concentration))×100.

The relation between the particle diameter of each uniform latex used and the corresponding uniform latex particle rejection rate (Rl) was plotted on a graph to form a smooth curve, and the uniform latex particle diameter at a rejection rate of 90% was determined as the pore size of the permselective membranes.

Method for Preparing Hollow Fiber Membranes

Hollow fiber membranes were produced according to a known dry/wet spinning process. While a hollow-forming fluid is being discharged from the central pipe of a tube-in-orifice-type, double-tube nozzle, a raw spinning liquid was discharged via the slits and run in the air, after which it was introduced into a bath for coagulation.

Method for Preparing Polyethersulfone Hollow Fiber Membranes

Polyethersulfone resin (SUMIKAEXCEL (trademark) 4800 P, manufactured by Sumitomo Chemical Co., Ltd.) and a hydrophilic polymer, polyvinyl pyrrolidone (Luvitec (trademark) K 30, manufactured by BASF Ltd.) were melted by heating in a mixture of a solvent and a poor solvent such that the concentrations of polyethersulfone and polyvinyl pyrrolidone would be 20 wt % and 3 wt %, respectively, thus yielding a raw spinning liquid. Using this raw spinning liquid, membranes were produced according to the dry/wet spinning process described above, so as to yield sponge-like-cross-section hollow fiber membranes with an outer diameter of 1200 μm and an inner diameter of 700 μm. Per single hollow fiber membrane, the fracture strength was 350 g, and the molecular weight cut-off was 300,000 daltons when evaluated in the same manner as the protein rejection performance.

Preparation of Polyvinylidene Fluoride Hollow Fiber Membranes

Polyvinylidene fluoride resin (SOLEF 6020, manufactured by Solvay Advanced Polymers) was melted by heating in a solvent such that the concentration would be 25 wt %, thus yielding a raw spinning liquid. Using this raw spinning liquid, membranes were produced according to the dry/wet spinning process described above, so as to yield sponge-like-cross-section hollow fiber membranes with an outer diameter of 1300 μm and an inner diameter of 700 μm. The fracture strength per single hollow fiber membrane was 300 g. The pore size of the hollow fiber membranes was 0.1 μm when evaluated in the same manner as the uniform latex rejection performance.

Preparation of Polyethylene Hollow Fiber Membranes

Twenty weight % of polyethylene resin (HI-ZEX MILLION 030S, manufactured by Mitsui Chemicals, Inc., viscosity average molecular weight: 450,000 daltons and a 3:7 mixture of a liquid paraffin and dioctyl phthalate in a total of 80 wt % were melted by heating to yield a raw spinning liquid. Using this raw spinning liquid, membranes were produced according to the dry/wet spinning process described above, so as to yield hollow fiber membranes with an outer diameter of 1300 μm and an inner diameter of 700 μm.

The rejection performance of the resulting polyethylene hollow fiber membranes was such that the pore size was 0.1 μm when evaluated in the same manner as the polyvinylidene fluoride hollow fiber membranes.

Example 1

Each end of a cleaning pipe was connected with a polyvinyl-chloride lower holder or upper holder having six sections and six premolded slits. In each section was inserted three bundles of polyethersulfone hollow fiber membranes, each bundle having an outer diameter of 1200 μm, an inner diameter of 700 μm, and a molecular weight cut-off of 300,000 daltons, and consisting of 960 membranes wound with a protective net. The bundles were then fixed by injecting polyurethane resin. After curing the polyurethane resin, a portion of the resin in the upper holder was cut off, together with the hollow fiber membranes, to provide open-ended membranes, thereby yielding a permselective membrane element. The upper holder had the configuration shown in FIG. 2. The lower holder, as shown in FIG. 3, had six projections, and slits with a width of 4 mm and a length of 74 mm which were positioned between sections and arranged radially from around the center of the holder. The cleaning pipe was made of polyvinyl chloride, and had an inner diameter of 51 mm, a length of 1170 mm, and six perforations of 10 mm in diameter positioned circumferentially around the side surface with a pitch of 30 mm, making a total of 222 perforations. The protective net was made of polyethylene, and had a mesh size of 4 mm and a thickness of 0.5 mm.

With the resulting permselective element being submerged in pure water, the interior of the hollow fiber membranes was subjected to a pressure of 0.2 MPa by the introduction of air. As a result, no bubbles rose from the hollow fiber membranes and the sealed end thereof, showing that the bonding condition of the resin-fixed portion was satisfactory, and the hollow fiber membranes were defect-free.

The resulting permselective membrane element was inserted into a polyvinyl-chloride cylindrical vessel with an outside diameter of 318 mm and a length of 1245 mm, and then a lower cap with a raw water inlet and scrubbing air inlet and an upper cap with a cleaning wastewater outlet were attached to the element to form a permselective membrane module. The total area of the raw water inlet, formed of the inner circumference and projections of the lower holder, as well as the inner circumference of the cylindrical vessel, was 9370 $mm^2$. The resulting permselective membrane module had a filling ratio of 44 vol % and a membrane area of 70 $m^2$.

The module had a pure water permeability of 27 $m^3$/hr at 0.1 MPa.

Lake water with a turbidity of 1 to 5 mg/L was fed into the permselective membrane module with the aforementioned structure at a pressure of 0.04 MPa, and 30 seconds of cleaning by air scrubbing and reverse filtration was carried out once every 30 minutes. This operation was continued for a month, and the filtrate flow rate and filtrate turbidity were then measured. The initial filtration rate was 2.9 $m^3$/hr, and the filtrate rate after a month was 2.9 $m^3$/hr, demonstrating stable filtration performance of the module. Similarly for the filtrate turbidity, it was initially 0.01 mg/L or less, and was still 0.01 mg/L or less after a month, without any problems such as leakage.

Example 2

To a polyvinyl-chloride cylindrical vessel with an outer diameter of 145 mm and a length of 1075 mm was attached polyvinyl-chloride holders with an outer diameter of 110 mm and a thickness of 40 mm. The holders had four sections for dividing hollow fiber membranes, and had slits with a width of 4 mm and a length of 20 mm between sections. A module vessel was then assembled, using a cleaning pipe which was made of polyvinyl chloride and had an inner diameter of 25 mm, a length of 1075 mm, and four perforations 5 mm in diameter positioned circumferentially around the side surface with a pitch of 45 mm, making a total of 88 perforations. Using polyethersulfone hollow fiber ultrafiltration membranes with an outer diameter of 1200 μm, an inner diameter of 700 μm, and a molecular weight cut-off of 300,000 daltons, eight bundles each of 420 membranes were prepared and put in a polyethylene protective net. Two bundles were inserted into each of the four sections of the filtration module vessel and bonded by injecting urethane resin. After curing the resin, a portion of an end of the hollow fiber membranes was cut off to form a membrane filtration module. The resulting permselective membrane module had a filling ratio of 40 vol % and a membrane area of 12 $m^2$.

Caps were then attached to the membrane module vessel thus formed to constitute a membrane filtration module. The module had a pure water permeability of 4 m³/hr at 0.1 MPa.

Lake water with a turbidity of 1 to 5 mg/L was fed into the permselective membrane module with the aforementioned structure at a pressure of 0.04 MPa, and 30 seconds of cleaning by air scrubbing and reverse filtration was carried out once every 30 minutes. This operation was continued for a month, and the filtrate flow rate and filtrate turbidity were then measured. The initial filtration rate was 0.8 m³/hr, and the filtrate rate after a month was 0.8 m³/hr, demonstrating stable filtration performance of the module. Similarly for the filtrate turbidity, it was initially 0.01 mg/L or less, and was still 0.01 mg/L or less after a month, without any problems such as leakage.

Example 3

To a polyvinyl-chloride cylindrical vessel with an outer diameter of 216 mm and a length of 1000 mm were attached polyvinyl-chloride holders with an outer diameter of 192 mm and a thickness of 40 mm. The holders had six sections for dividing hollow fiber membranes, and had slits with a width of 4 mm and a length of 50 mm between sections. A module vessel was then assembled, using a cleaning pipe which was made of polyvinyl chloride and had an inner diameter of 25 mm, a length of 1075 mm, and four perforations 5 mm in diameter positioned circumferentially around the side surface with a pitch of 30 mm, making a total of 132 perforations. Using polyethersulfone hollow fiber ultrafiltration membranes with an outer diameter of 1200 μm, an inner diameter of 700 μm, and a molecular weight cut-off of 300,000 daltons, eight bundles each having 1200 membranes were prepared and put in a polyethylene protective net. Two bundles were inserted into each of the four sections of the filtration module vessel, and bonded by injecting urethane resin. After curing the resin, a portion of an end of the hollow fiber membranes was cut off to form a membrane filtration module. The resulting permselective membrane module had a filling ratio of 40 vol % and a membrane area of 35 m².

Caps were then attached to the membrane module vessel thus formed to constitute a membrane filtration module. The module had a pure water permeability of 12 m³/hr at 0.1 MPa.

Lake water with a turbidity of 1 to 5 mg/L was fed into the permselective membrane module with the aforementioned structure at a pressure of 0.04 MPa, and 30 seconds of cleaning by air scrubbing and reverse filtration was carried out once every 30 minutes. This operation was continued for a month, and the filtrate flow rate and filtrate turbidity were then measured. The initial filtration rate was 2.3 m³/hr, and the filtrate rate after a month was 2.3 m³/hr, demonstrating stable filtration performance of the module. Similarly for the filtrate turbidity, it was initially 0.01 mg/L or less, and was still 0.01 mg/L or less after a month, without any problems such as leakage.

Example 4

A module vessel was assembled using the same polyvinyl-chloride cylindrical vessel, polyvinyl-chloride holders, and polyvinyl-chloride cleaning pipe as in Example 2. Using polyvinylidene-fluoride hollow fiber microfiltration membranes with an outer diameter of 1300 μm, an inner diameter of 700 μm, and a pore size of 0.1 μm, eight bundles each having 360 membranes were prepared and put in a polyethylene protective net. Two bundles were inserted into each of the four sections of the filtration module vessel, and bonded by injecting urethane resin. After curing the resin, a portion of an end of the hollow fiber membranes was cut off to form a membrane filtration module. The resulting permselective membrane module had a filling ratio of 45 vol % and a membrane area of 11 m².

With the exterior of the hollow fiber membranes of the resulting module being filled with water, compressed air was introduced to the interior of the hollow fiber membranes at 0.2 MPa. As a result, no bubbles rose from the sealed end of the membranes, showing that the sealing condition was satisfactory. Caps were then attached to the membrane module vessel thus formed to constitute a membrane filtration module. The module had a pure water permeability of 18 m³/hr at 0.1 MPa.

Lake water with a turbidity of 1 to 5 mg/L was fed into the permselective membrane module with the aforementioned structure at a pressure of 0.03 MPa, and 30 seconds of cleaning by air scrubbing and reverse filtration was carried out once every 30 minutes. This operation was continued for a month, and the filtrate flow rate and filtrate turbidity were then measured. The initial filtration rate was 0.7 m³/hr, and the filtrate rate after a month was 0.7 m³/hr, demonstrating stable filtration performance of the module. Similarly for the filtrate turbidity, it was initially 0.01 mg/L or less, and was still 0.01 mg/L or less after a month, without any problems such as leakage.

Example 5

A module vessel was assembled using the same polyvinyl-chloride cylindrical vessel, polyvinyl-chloride holders, and polyvinyl-chloride cleaning pipe as in Example 2. Using polyethylene hollow fiber microfiltration membranes with an outer diameter of 1300 μm, an inner diameter of 700 μm, and a pore size of 0.1 μm, eight bundles each having 360 membranes were prepared and put in a polyethylene protective net. Two bundles were inserted into each of the four sections of the filtration module vessel, and bonded by injecting urethane resin. After curing the resin, a portion of an end of the hollow fiber membranes was cut off to form a membrane filtration module. The resulting permselective membrane module had a filling ratio of 45 vol % and a membrane area of 11 m².

With the exterior of the hollow fiber membranes of the resulting module being filled with water, compressed air was introduced to the interior of the hollow fiber membranes at 0.2 MPa. As a result, no bubbles rose from the sealed end of the membranes, showing that the sealing condition was satisfactory. Caps were then attached to the membrane module vessel thus formed to constitute a membrane filtration module. The module had a pure water permeability of 17 m³/hr at 0.1 MPa.

Lake water with a turbidity of 1 to 5 mg/L was fed into the permselective membrane module with the aforementioned structure at a pressure of 0.03 MPa, and 30 seconds of cleaning by air scrubbing and reverse filtration was carried out once every 30 minutes. This operation was continued for a month, and the filtrate flow rate and filtrate turbidity were then measured. The initial filtration rate was 0.65 m³/hr, and the filtrate rate after a month was 0.65 m³/hr, demonstrating stable filtration performance of the module. Similarly for the filtrate turbidity, it was initially 0.01 mg/L or less, and was still 0.01 mg/L or less after a month, without any problems such as leakage.

Example 6

A module vessel was assembled using the same polyvinyl-chloride cylindrical vessel and the same polyvinyl-chloride cleaning pipe as in Example 2, and polypropylene mold members with an outer diameter of 135 mm and a thickness of 42 mm. The mold members had four sections for dividing hollow fiber membranes, and had slits with a width of 4 mm and a length of 20 mm between sections. Using polyethersulfone hollow fiber ultrafiltration membranes with an outer diameter of 1200 μm, an inner diameter of 700 μm, and a molecular weight cut-off of 300,000 daltons, four bundles each having 840 membranes were prepared and put in a polyethylene protective net. One bundle was inserted into each of the four sections of the filtration module vessel, and bonded by injecting urethane resin. The slits at the sealed end were molded by injecting urethane resin between the sealed end and the polypropylene mold members with slits, and removing the mold members after curing the resin. After curing the resin, a portion of an end of the hollow fiber membranes was cut off to form a membrane filtration module. The resulting permselective membrane module had a filling ratio of 40 vol % and a membrane area of 12 m².

With the exterior of the hollow fiber membranes of the resulting module being filled with water, compressed air was introduced to the interior of the hollow fiber membranes at 0.2 MPa. As a result, bubbles were observed rising from several places at the sealed end. This is a phenomenon caused by poor sealing, and the sealing resin was removed together during the removal of the members with slits.

Example 7

A module vessel was assembled using the same polyvinyl-chloride cylindrical vessel, same polyvinyl-chloride holders, and same polyvinyl-chloride cleaning pipe as in Example 2. Using polyethersulfone hollow fiber ultrafiltration membranes with an outer diameter of 1200 μm, an inner diameter of 700 μm, and a molecular weight cut-off of 300,000 daltons, four bundles each having 840 membranes were prepared without putting them in a polyethylene protective net. One bundle was inserted into each of the four sections of the filtration module vessel, and bonded by injecting urethane resin. After curing the resin, a portion of an end of the hollow fiber membranes was cut off to form a membrane filtration module. The resulting permselective membrane module had a filling ratio of 40 vol % and a membrane area of 12 m².

Caps were then attached to the membrane module vessel thus formed to constitute a membrane filtration module. The module had a pure water permeability of 4 m³/hr at 0.1 MPa.

Lake water with a turbidity of 1 to 5 mg/L was fed into the permselective membrane module with the aforementioned structure at a pressure of 0.04 MPa, and 30 seconds of cleaning by air scrubbing and reverse filtration was carried out once every 30 minutes. This operation was continued for a month, and the filtrate flow rate and filtrate turbidity were then measured. The initial filtration rate was 0.8 m³/hr, and the filtrate rate after a month was 0.8 m³/hr, demonstrating stable filtration performance of the module. The filtrate turbidity, however, was initially 0.01 mg/L or less, but became 0.1 mg/L or more after a month, with leakage from around the hollow fiber membrane bundles. This is probably because shaking became uncontrolled and strong, due to the hollow fiber membranes not being protected with a polyethylene protective net.

Comparative Example 1

A module vessel was assembled using a polyvinyl-chloride cylindrical vessel with an outer diameter of 145 mm and a length of 1000 mm and polyvinyl-chloride holders with an outer diameter of 110 mm and a thickness of 40 mm. The holders had four sections for dividing hollow fiber membranes, and had slits with a width of 4 mm and a length of 20 mm between sections. Using polyethersulfone hollow fiber ultrafiltration membranes with an outer diameter of 1200 μm, an inner diameter of 700 μm, and a molecular weight cut-off of 300,000 daltons, four bundles each having 840 membranes were prepared and put in a polyethylene net. One bundle was inserted into each of the four sections of the filtration module vessel, and bonded by injecting urethane resin as in Example 2, except that a cleaning pipe was not used. After curing the resin, a portion of an end of the hollow fiber membranes was cut off to form a membrane filtration module. The resulting permselective membrane module had a filling ratio of 30 vol % and a membrane area of 12 m².

Caps were then attached to the membrane module vessel thus formed to constitute a membrane filtration module. The module had a pure water permeability of 4 m³/hr at 0.1 MPa.

Lake water with a turbidity of 1 to 5 mg/L was fed into the permselective membrane module with the aforementioned structure at a pressure of 0.04 MPa, and 30 seconds of cleaning by air scrubbing and reverse filtration was carried out once every 30 minutes. Because a cleaning pipe was not used, cleaning wastewater from the module was drained from an outlet on the side surface of the upper portion of the module vessel. This operation was continued for a month, and the filtrate flow rate and filtrate turbidity were then measured. The initial filtration rate was 0.8 m³/hr, and the filtrate rate after a month was 0.8 m³/hr, demonstrating stable filtration performance of the module. The filtrate turbidity, however, was initially 0.01 mg/L or less, but became 0.1 mg/L or more after a month. After the removal of the upper cap from the module, the raw water chamber was filled with water, and then air was introduced into the raw water chamber. As a result, air was observed rising from some place at the open end. Air was observed rising from the hollow fiber membranes located near the outlet, which can be attributed to the breakage of the hollow fiber membranes by the force of the water draining from the outlet.

Comparative Example 2

The same module as in Example 2 was prepared, and a plug was attached to a location 15 mm away from the sealed end of the core pipe, with eight holes provided below the plug. The resulting permselective membrane module had a filling ratio of 40 vol % and a membrane area of 12 m².

Caps were then attached to the membrane module vessel thus formed to constitute a membrane filtration module. The module had a pure water permeability of 4 m³/hr at 0.1 MPa.

Lake water with a turbidity of 1 to 5 mg/L was fed into the permselective membrane module with the aforementioned structure at a pressure of 0.04 MPa, and 30 seconds of cleaning by air scrubbing and reverse filtration was carried out once every 30 minutes. During cleaning, scrubbing air was supplied through the eight holes provided in the lower portion of the core pipe, and the cleaning wastewater was discharged from the upper portion of the core pipe through the perforations excluding these eight holes. This operation was continued for a month, and the filtrate flow rate and filtrate turbidity were then measured. The initial filtration rate was 0.8 m³/hr, and the filtrate rate after a month was 0.6 m³/hr, showing a small reduction in filtration performance. The filtrate turbidity was initially 0.01 mg/L or less, but became 0.1 mg/L or more after a month, with leakage from the hollow fiber membranes near the core pipe. This is probably because, when scrubbing air was introduced through the holes in the lower portion of the core pipe, air passed perpendicular to the hollow fiber membranes, causing damage to the hollow fiber membranes near the core pipe.

INDUSTRIAL APPLICABILITY

In the method for manufacturing permselective membrane modules according to the invention, the use of premolded holders can remarkably improve the production yield, durability, and quality of the module. Moreover, the permselective membrane module produced by the method of the invention allows suspended solids to effectively float over the membrane surface, while being excellent at discharging the suspended solids from the system, thus reducing cleaning costs. In addition, excellent performance recovery of the permselective membrane module can lengthen the element life. Furthermore, the replacement of membranes involves only the replacement of an element, thereby reducing water filtration costs. The permselective membrane module is thus expected to greatly contribute to industrial development.

What is claimed is:

1. A method for manufacturing a permselective membrane module, the module including permselective membranes housed in a vessel with both ends of the membranes being fixed; the method comprising:
    preparing at least one cleaning pipe, the pipe having a first open end, a second closed end and an outer surface with a plurality of perforations;
    preparing an upper holder comprising through-hole sections separated by stays and a central through-hole for the cleaning pipe;
    preparing a lower holder having sections separated by stays having slits therethrough;
    preparing a plurality of permselective membranes comprising hollow fiber membranes;
    connecting the first end of the cleaning pipe to the center of the upper holder and connecting the second end of the cleaning pipe to the center of the lower holder;
    making an element by fixing first ends of the hollow fiber membranes to the through-holes of the upper holder and by fixing second ends of the hollow fiber membranes with the lower holder; and
    placing the element in a vessel;
    wherein raw water can be supplied from the lower portion of the vessel to the surface of the hollow membranes via the lower holder; and
    the filtrate is discharged from the upper end of the hollow membranes which are fixed to the upper holder; and
    suspended matter entering the cleaning pipe via the perforations of the cleaning pipe can be discharged out of the cleaning pipe when cleaning the hollow membranes.

2. The method according to claim 1, wherein the upper and lower holders are made of a premolded metal or plastic.

3. The method according to claim 1, wherein the lower holder is provided with slit holes for introducing scrubbing air.

4. The method according to claim 1, wherein the upper and lower holders are provided with sections for fixing the permselective membranes.

5. The method according to claim 1, wherein permselective membranes are inserted into each section of the upper and lower holders and fixed by bonding with a resin.

6. The method according to claim 1, wherein a plurality of projections are disposed on the side surface of the lower holder, so as to contact the inner surface of the vessel.

7. The method according to claim 1, wherein the hollow fiber membranes are divided into a plurality of bundles.

8. The method according to claim 7, wherein each bundle is wound with a protective net.

9. A permselective membrane module comprising:
    a vessel;
    a filtering element housed in the vessel, the element comprising:
        an upper holder comprising through-hole sections separated by stays;
        a lower holder comprising sections separated by stays having slits therethrough;
        at least one cleaning pipe, the pipe having a first open end, a second closed end and an outer surface with a plurality of perforations, wherein the upper holder includes a central through-hole for the at least one cleaning pipe; and
        a plurality of permselective membranes comprising hollow fiber membranes;
    wherein the first end of the cleaning pipe is connected to the center of the upper holder and the second end of the cleaning pipe is connected to the center of the lower holder,
    wherein the first ends of the hollow fiber membranes are fixed to the through-holes of the upper holder and second ends of the hollow fiber membranes are fixed to the lower holder; and
    wherein water can be supplied from the lower portion of the vessel to the hollow membranes via the lower holder.

10. The module according to claim 9, wherein the upper and lower holders are made of a premolded metal or plastic.

11. The module according to claim 9, wherein the lower holder is provided with slit holes for introducing scrubbing air.

12. The module according to claim 9, wherein the upper and lower holders are provided with sections for fixing the permselective membranes, and the through-holes are formed in the sections of the upper holder.

13. The module according to claim 12, wherein the permselective membranes are inserted into each section of the upper and lower holders and fixed by bonding with a resin.

14. The module according to claim 9, wherein a plurality of projections are disposed on the side surface of the lower holder, so as to contact the inner surface of the vessel.

15. The module according to claim 9, wherein the hollow fiber membranes are divided into a plurality of bundles.

16. The module according to claim 15, wherein each bundle is wound with a protective net.

* * * * *